United States Patent
Schultes et al.

(10) Patent No.: US 8,722,788 B2
(45) Date of Patent: *May 13, 2014

(54) TRANSPARENT TPU (THERMOPLASTIC POLYURETHANES)/PMMA (POLYMETHYL (METH) ACRYLATE) BLENDS WITH IMPROVED LOW-TEMPERATURE IMPACT RESISTANCE

(75) Inventors: Klaus Schultes, Wiesbaden (DE); Peter Battenhausen, Brachttal-Udenhain (DE); Ursula Golchert, Dieburg (DE); Adalbert Loidl, Palling (DE)

(73) Assignees: EVONIK ROEHM GmbH, Darmstadt (DE); CPS GmbH, Thansau/Rohrdorf (DE)

( * ) Notice: Subject to any disclaimer, the term of this patent is extended or adjusted under 35 U.S.C. 154(b) by 473 days.

This patent is subject to a terminal disclaimer.

(21) Appl. No.: 12/094,277

(22) PCT Filed: Aug. 28, 2006

(86) PCT No.: PCT/EP2006/065707
§ 371 (c)(1),
(2), (4) Date: Sep. 24, 2008

(87) PCT Pub. No.: WO2007/057242
PCT Pub. Date: May 24, 2007

(65) Prior Publication Data
US 2009/0105399 A1    Apr. 23, 2009

(30) Foreign Application Priority Data

Nov. 21, 2005   (DE) .................... 10 2005 055 793

(51) Int. Cl.
*C08G 18/08*   (2006.01)
*C08L 75/00*   (2006.01)
*C08F 8/30*    (2006.01)

(52) U.S. Cl.
USPC .......................................... 524/507; 525/123

(58) Field of Classification Search
USPC .......................................... 524/507; 525/123
See application file for complete search history.

(56) References Cited

U.S. PATENT DOCUMENTS

| | | | |
|---|---|---|---|
| 3,700,752 A | | 10/1972 | Hutchinson |
| 3,793,402 A * | | 2/1974 | Owens .............................. 525/81 |
| 3,859,381 A * | | 1/1975 | Hutchinson ..................... 528/75 |
| 4,098,733 A * | | 7/1978 | Olstowski et al. ............. 521/123 |
| 4,179,479 A * | | 12/1979 | Carter, Jr. ....................... 525/66 |
| 4,513,118 A * | | 4/1985 | Suetterlin et al. ............... 525/81 |
| 4,833,221 A | | 5/1989 | Albrecht |
| 5,063,259 A * | | 11/1991 | Wanat et al. .................. 523/201 |
| 5,110,877 A | | 5/1992 | Hoess et al. |
| 5,155,172 A | | 10/1992 | Siol et al. |
| 5,216,062 A * | | 6/1993 | Lausberg et al. ............. 524/404 |
| 5,219,643 A * | | 6/1993 | Schmidt et al. ............... 428/213 |
| 5,219,931 A | | 6/1993 | Siol et al. |
| 5,237,001 A * | | 8/1993 | Piejko et al. ..................... 525/66 |
| 5,260,375 A * | | 11/1993 | Lausberg et al. ............... 525/66 |
| 5,266,645 A * | | 11/1993 | Siol et al. ........................ 525/309 |
| 5,270,397 A * | | 12/1993 | Rhein et al. .................... 525/309 |
| 5,280,073 A | | 1/1994 | Siol et al. |
| 5,326,523 A * | | 7/1994 | Gustavel et al. ............... 264/257 |
| 5,395,882 A * | | 3/1995 | Siol et al. ......................... 525/82 |
| 5,474,134 A * | | 12/1995 | Spotzl et al. ................... 156/475 |
| 5,530,080 A | | 6/1996 | Siol et al. |
| 5,539,053 A | | 7/1996 | Avenel |
| 5,548,033 A | | 8/1996 | Vetter et al. |
| 5,612,417 A | | 3/1997 | Rhein et al. |
| 5,639,826 A * | | 6/1997 | Niessner ........................ 525/127 |
| 5,652,316 A | | 7/1997 | May et al. |
| 5,705,189 A | | 1/1998 | Lehmann et al. |
| 5,726,245 A | | 3/1998 | Numrich et al. |
| 5,834,542 A * | | 11/1998 | Kielhorn-Bayer et al. ... 524/195 |
| 5,859,146 A * | | 1/1999 | Kielhorn-Bayer et al. ... 525/399 |
| 5,952,424 A * | | 9/1999 | Schultze ........................ 525/130 |
| 5,973,074 A * | | 10/1999 | Campbell et al. ............. 525/125 |
| 6,040,387 A | | 3/2000 | Albrecht et al. |
| 6,214,942 B1 | | 4/2001 | Siol et al. |
| 6,287,470 B1 | | 9/2001 | Vetter et al. |
| 6,355,712 B1 | | 3/2002 | Schultes et al. |
| 6,576,255 B1 | | 6/2003 | Petereit et al. |
| 6,613,871 B2 | | 9/2003 | Hoess et al. |
| 6,765,046 B1 | | 7/2004 | Numrich et al. |
| 6,803,416 B2 | | 10/2004 | Schultes et al. |
| 6,809,163 B2 | | 10/2004 | Schultes et al. |
| 6,890,993 B2 | | 5/2005 | Schultes et al. |
| 6,998,140 B2 | | 2/2006 | Meier et al. |
| 7,179,852 B2 | | 2/2007 | Schultes et al. |
| 7,381,552 B2 | | 6/2008 | Menzler et al. |

(Continued)

FOREIGN PATENT DOCUMENTS

| | | |
|---|---|---|
| DE | 102 60 065 | 7/2004 |
| EP | 0 272 975 | 6/1988 |

(Continued)

OTHER PUBLICATIONS

Machine translation of EP 0 272 975. 1988.*
U.S. Appl. No. 60/831,222, filed Jul. 17, 2006, Hager, et al.
U.S. Appl. No. 12/300,408, filed Nov. 11, 2008, Hoess, et al.
U.S. Appl. No. 12/436,809, filed May 7, 2009, Schultes, et al.
U.S. Appl. No. 11/748,874, filed May 15, 2007, Schultes, et al.
U.S. Appl. No. 11/970,190, filed Jan. 7, 2008, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/913,325, filed Nov. 1, 2007, Schwarz-Barac, et al.
Desmonpan: Flexible High-Tech Material, Product Range—Reference Data, pp. 1- 23, Ed. 10.2008.

(Continued)

*Primary Examiner* — Angela C Scott
(74) *Attorney, Agent, or Firm* — Oblon, Spivak, McClelland, Maier & Neustadt, L.L.P.

(57) ABSTRACT

The invention describes transparent plastics mixtures having low-temperature impact resistance composed of a thermoplastic polyurethane (TPU) and of an impact-modified poly(meth)acrylate (PMMA).

16 Claims, No Drawings

(56) References Cited

U.S. PATENT DOCUMENTS

| | | |
|---|---|---|
| 7,456,239 B2 | 11/2008 | Theil et al. |
| 7,879,966 B2 | 2/2011 | Petereit et al. |
| 8,158,709 B2 * | 4/2012 | Numrich et al. ............. 524/507 |
| 2002/0160042 A1 | 10/2002 | Petereit et al. |
| 2004/0038041 A1 * | 2/2004 | Chao et al. ................. 428/424.8 |
| 2004/0104501 A1 | 6/2004 | Petereit et al. |
| 2004/0116567 A1 | 6/2004 | Schmitt et al. |
| 2004/0167277 A1 * | 8/2004 | Chang et al. .................... 525/67 |
| 2005/0080188 A1 | 4/2005 | Schultes et al. |
| 2005/0152977 A1 | 7/2005 | Petereit et al. |
| 2006/0052515 A1 | 3/2006 | Schultes et al. |
| 2006/0147714 A1 | 7/2006 | Schultes et al. |
| 2006/0175735 A1 | 8/2006 | Hoess et al. |
| 2007/0055017 A1 | 3/2007 | Schultes et al. |
| 2007/0066708 A1 | 3/2007 | Goldacker et al. |
| 2007/0106022 A1 * | 5/2007 | Weber et al. ..................... 525/66 |
| 2007/0112135 A1 | 5/2007 | Wicker et al. |
| 2007/0122624 A1 | 5/2007 | Schultes et al. |
| 2007/0123610 A1 | 5/2007 | Schultes et al. |
| 2007/0197703 A1 | 8/2007 | Neuhauser et al. |
| 2007/0222117 A1 | 9/2007 | Hoess et al. |
| 2007/0276093 A1 | 11/2007 | Schultes et al. |
| 2008/0161469 A1 | 7/2008 | Hoss et al. |
| 2008/0242782 A1 | 10/2008 | Hager et al. |
| 2008/0248298 A1 | 10/2008 | Numrich et al. |
| 2008/0281023 A1 | 11/2008 | Numrich et al. |
| 2010/0098907 A1 | 4/2010 | Schultes et al. |
| 2010/0098908 A1 | 4/2010 | Schultes et al. |
| 2010/0148401 A1 | 6/2010 | Schultes et al. |
| 2010/0167045 A1 | 7/2010 | Schultes et al. |
| 2010/0174022 A1 | 7/2010 | Schultes et al. |
| 2010/0189983 A1 | 7/2010 | Numrich et al. |
| 2011/0009539 A1 | 1/2011 | Goldacker et al. |
| 2011/0015317 A1 | 1/2011 | Khrenov et al. |
| 2011/0269883 A1 | 11/2011 | Battenhausen et al. |
| 2011/0290300 A1 | 12/2011 | Battenhausen et al. |

FOREIGN PATENT DOCUMENTS

| | | |
|---|---|---|
| EP | 0 447 309 B1 | 9/1991 |
| EP | 4-270717 | 9/1992 |
| EP | 10-324787 | 12/1998 |
| WO | 03 066695 | 8/2003 |
| WO | WO 03/064485 A1 | 8/2003 |
| WO | WO 2004/033824 A1 | 4/2004 |
| WO | WO 2004/042471 A1 | 5/2004 |
| WO | WO 2004/056892 A2 | 7/2004 |
| WO | WO 2005/022253 A1 | 3/2005 |

OTHER PUBLICATIONS

U.S. Appl. No. 12/919,166, filed Aug. 24, 2010, Numrich, et al.
Russian Office Action issued Aug. 23, 2010, in Patent Application No. 2008124807/05.
U.S. Appl. No. 12/738,033, filed Apr. 14, 2010, Schultes, et al.
U.S. Appl. No. 12/682,405, filed Apr. 9, 2010, Schmidt, et al.
Office Action issued Nov. 9, 2012, in Canadian Patent Application No. 2,628,890.
U.S. Appl. No. 13/241,776, filed Sep. 23, 2011, Hoess, et al.
Office Action issued Jan. 20, 2012, in Japanese Patent Application No. 2008-541668 filed Aug. 28, 2006 (English translation).
Office Action issued Jun. 19, 2013 in Canadian Application No. 2,628,890.

* cited by examiner

TRANSPARENT TPU (THERMOPLASTIC POLYURETHANES)/PMMA (POLYMETHYL (METH) ACRYLATE) BLENDS WITH IMPROVED LOW-TEMPERATURE IMPACT RESISTANCE

CROSS-REFERENCE TO RELATED APPLICATIONS

The present application is a 35 U.S.C. §371 National Stage patent application of International patent application PCT/EP06/065707, filed on Aug. 28, 2006, which claims priority to German patent application DE 102005055793.7, filed on Nov. 21, 2005.

FIELD OF THE INVENTION

The present invention relates to transparent blends composed of thermoplastic polyurethanes (TPUs) with polymethyl (meth)acrylate (PMMA), and to plastics mouldings having improved low-temperature impact resistance produced therefrom.

PRIOR ART

There is large-scale production of impact-resistant moulding compositions (irmcs) based on PMMA. "Impact modifiers" are used to achieve increased impact resistance of the moulding compositions. These modifiers are compounded into the corresponding standard PMMA moulding compositions.

Core/shell/shell (C/S1/S2) particles (particle size from 100 to 1000 nm) are often used as impact modifiers in PMMA moulding compositions, and are usually prepared by way of emulsion polymerization. The core in these C/S1/S2 particles is composed of a crosslinked polymer, composed (except for the crosslinking agent) very substantially from monomers identical with those of the matrix. The first shell (S1), which forms the elastomeric phase, is composed of butyl acrylate rubber, which is mostly matched to the refractive indices of the matrix via copolymerization of styrene or of its derivatives. The second shell binds the particles to the matrix and is composed of a non-crosslinked polymer, whose monomers are very similar to the constituents of the matrix.

Because of the structure of the typical impact modifiers based on butyl acrylate, they do not achieve high impact resistances at low temperatures (–40° Celsius). At these temperatures the rubber phase of the modifiers becomes hard.

Impact-resistant PMMA moulding compositions can be broadly divided into transparent and non-transparent PMMA moulding compositions.

Transparent impact-resistant moulding compositions are generally prepared by way of butyl-acrylate-based modifiers. Products which may be mentioned here are PLEXIGLAS® zk50 from Röhm GmbH & Co. KG, ACRYLITE PLUS® zk6 from Cyro and ALTUGLAS® DR from Altuglas.

The patent DE 41 36 993 (BASF AG) "Transparent, impact-modified PMMA-mouldings with improved low temperature impact resistance and high weathering stability" describes a constitution similar to that in U.S. Pat. No. 3,793,402. However, incorporation of a phenyl-C1-C4-alkyl acrylate into the tough phase (S1) is necessary here. In the examples, PMMA moulding compositions with good low-temperature impact resistance are described; the constitution of the best moulding composition (Example 6) here is as follows:

Modifier:
Core: MMA-allyl methacrylate-methyl acrylate=98.6-0.5-0.9
Shell 1: Butyl acrylate-phenylethyl acrylate-allyl methacrylate-1,4-butanediol methacrylate=72.3-25.8-1.4-0.5
Shell 2: MMA-methyl acrylate=96.0-4.0 C/S1/S2 ratio=20/50/30

PMMA moulding composition: approx. molar mass 100000 g/mol,
MMA-methyl acrylate=99-1
Mixing ratio moulding composition/modifier=45/55 (ratios by weight)

The Izod impact resistance of this moulding composition at room temperature is 85 kJ/m$^2$ and at –20° C. is 52 kJ/m$^2$.

In the case of the conventional impact-resistant moulding compositions, impact resistance begins to fall away markedly at –10° C. Modulus of elasticity in high-impact-resistance moulding compositions such as PLEXIGLAS® zk50 is moreover 950 MPa. Although modulus of elasticity in impact-resistant moulding compositions such as Acrylite Plus® zk6 is high at 1800 MPa, the impact resistance values here are only 80 kJ/m$^2$.

PMMA moulding compositions produced with weathering resistance and low-temperature impact resistance are mostly non-transparent. The following patent applications or patents may be mentioned here as prior art.

WO 2003/066695: Here, the good low-temperature impact resistance is achieved via use of silicone rubber modifier.

DE 10 260 065 A1: Good low-temperature impact resistance as far as –20° C. is obtained via reduction of the amount of styrene in butyl acrylate rubber of the modifier and use of this type of modifier. However, the reduction in the amount of styrene markedly reduces the transparency of the moulding composition. (The refractive indices of butyl acrylate rubber and PMMA are different.)

OBJECT

The intention was now to find a PMMA-based blend whose impact resistance extends to low temperatures. The further intention was that mouldings produced from this compounded material via injection moulding or extrusion should retain acceptable transparency and be printable using the usual inks. Furthermore, the mouldings should have weathering resistance and retain a high tensile modulus. For the purposes of the invention, "low temperatures" are temperatures in the range of from –10° C. to –40° C., for example. "Acceptable transparency" is a transmittance value of about 80% (t=3 mm), for example.

ACHIEVEMENT OF OBJECT

The object can be achieved via blends of impact-modified PMMA moulding compositions and thermoplastic polyurethanes (TPUs) (ratio by weight between impact-resistant PMMA/TPU=50/90 to 80/10). Preference is given to a ratio by weight of PMMA to TPU of 70 parts of PMMA to 30 parts of TPU, and particular preference is given to a ratio by weight of PMMA to TPU of 60 parts of PMMA to 40 parts of TPU.

The resultant Charpy impact resistance values of these blends are above 100 kJ/m$^2$ at 23° Celsius and still 23 kJ/m$^2$ at –40° Celsius (thus being markedly higher than in impact-modified transparent PMMAs). Test specimens of thickness 3 mm composed of this material moreover retain transmittance above 80%.

Foils composed of these blends are much easier to print than foils conventionally used here composed of polyamide or TPU/MABS blends and are resistant to weathering.

For the purposes of the present invention, the term (meth) acrylate encompasses methacrylates and acrylates and mixtures of the two.

As PMMA moulding composition a mixture composed of two (meth)acrylate polymers, component a.) and component b.), is used.

Component a.)

Polymethyl methacrylates are generally obtained via free-radical polymerization of mixtures which comprise methyl methacrylate. These mixtures generally comprise at least 40% by weight, preferably at least 60% by weight, and particularly preferably at least 80% by weight, of methyl methacrylate, based on the weight of the monomers.

Alongside this, these mixtures for preparing polymethyl methacrylates may comprise other (meth)acrylates which are copolymerizable with methyl methacrylate. The term (meth) acrylates encompasses methacrylates and acrylates, and also mixtures of the two.

These monomers are well known. They include (meth) acrylates derived from saturated alcohols, for example methyl acrylate, ethyl (meth)acrylate, propyl (meth)acrylate, n-butyl (meth)acrylate, tert-butyl (meth)acrylate, pentyl (meth)acrylate and 2-ethylhexyl (meth)acrylate; (meth)acrylates derived from unsaturated alcohols, for example oleyl (meth)acrylate, 2-propynyl (meth)acrylate, allyl (meth)acrylate, vinyl (meth)acrylate; aryl (meth)acrylates, such as benzyl (meth)acrylate or phenyl (meth)acrylate, where in each case the aryl radicals may be unsubstituted or have up to four substituents; cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)-acrylates, such as 1,4-butanediol (meth)acrylate, (meth)acrylates of ether alcohols, for example tetrahydrofurfuryl (meth)acrylate, vinyloxyethoxyethyl (meth)acrylate; amides and nitriles of (meth)acrylic acid, for example N-(3-dimethylaminopropyl)-(meth)acrylamide, N-(diethylphosphono)(meth)acrylamide, 1-methacryloylamido-2-methyl-2-propanol; sulphur-containing methacrylates, such as ethylsulphinylethyl (meth)acrylate, 4-thiocyanatobutyl (meth)acrylate, ethylsulphonylethyl (meth)acrylate, thiocyanatomethyl (meth)acrylate, methylsulphinylmethyl (meth) acrylate, bis((meth)acryloyloxyethyl) sulphide; polyfunctional (meth)acrylates, such as trimethyloylpropane tri(meth) acrylate.

Besides the abovementioned (meth)acrylates, the compositions to be polymerized may also comprise other unsaturated monomers copolymerizable with methyl methacrylate and the abovementioned (meth)acrylates. They include 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, such as vinyltoluene and p-methylstyrene, halogenated styrenes, such as mono-chlorostyrenes, dichlorostyrenes, tribromostyrenes and tetrabromostyrenes; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinyl-pyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, such as maleic anhydride, methylmaleic anhydride, maleimide, methylmaleimide; and dienes, such as divinylbenzene.

The amount generally used of these comonomers is from 0 to 60% by weight, preferably from 0 to 40% by weight, and particularly preferably from 0 to 20% by weight, based on the weight of the monomers, and these compounds may be used individually or in the form of a mixture.

The polymerization is generally initiated using known free-radical initiators. Among the preferred initiators are, inter alia, the azo initiators well-known to the person skilled in the art, for example AIBN and 1,1-azobiscyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxyisopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals.

The amount often used of these compounds is from 0.01 to 10% by weight, preferably from 0.5 to 3% by weight, based on the weight of the monomers.

Use may be made here of various poly(meth)acrylates which differ, for example in their molecular weight or in their monomeric constitution.

The matrix may moreover comprise other polymers in order to modify its properties. Among these are, inter alia, polyacrylonitriles, polystyrenes, polyethers, polyesters, polycarbonates and polyvinyl chlorides. These polymers may be used individually or in the form of a mixture, and it is also possible here to use copolymers which are derivable from the abovementioned polymers.

The weight-average molar mass $M_w$ of the homo- and/or copolymers to be used as matrix polymers according to the invention may vary within a wide range, the molar mass usually being matched to the intended use and to the mode of processing of the moulding composition. However, it is generally in the range from 20000 to 1000000 g/mol, preferably from 50000 to 500000 g/mol and particularly preferably from 80000 to 300000 g/mol, with no intended resultant restriction.

Component b)

Component b) is an impact modifier based on crosslinked poly(meth)acrylates. Component b.) preferably has core/shell/shell structure.

Preferred impact modifiers are polymer particles which have core-shell-shell structure and which can be obtained via emulsion polymerization (see, for example, EP-A 0 113 924, EP-A 0 522 351, EP-A 0 465 049 and EP-A 0 683 028). Typical particle sizes (diameter) of these emulsion polymers are in the range from 100 to 600 nm, preferably from 200 to 500 nm.

The following method can be used to create a three-layer or three-phase structure having a core and two shells. An innermost (hard) shell can by way of example be composed in essence of methyl methacrylate, of very small proportions of comonomers, e.g. ethyl acrylate, and of a proportion of crosslinking agent, e.g. allyl methacrylate. The middle (soft) shell can by way of example be composed of butyl acrylate and styrene, while the outermost (hard) shell mostly corresponds in essence to the matrix polymer, thus giving compatibility and good coupling to the matrix.

The core preferably encompasses, based in each case on its total weight,

A) from 50.0% by weight to 99.9% by weight, advantageously from 60.0% by weight to 99.9% by weight, preferably from 75.0% by weight to 99.9% by weight, particularly preferably from 80.0% by weight to 99.0% by weight, particularly from 85.0% by weight to 99.0% by weight, of alkyl methacrylate repeat units having from 1 to 20, preferably from 1 to 12, in particular from 1 to 8, carbon atoms in the alkyl radical, B) from 0.0% by weight to 40.0% by weight, preferably from 0.0% by weight to 24.9% by weight, advantageously from 1.0% by weight to 29.9% by weight, in particular from 1.0% by weight to 14.9% by weight, of alkyl acrylate repeat units having from 1 to 20, preferably from 1 to 12, particularly preferably from 1 to 8, in particular from 1 to 4, carbon atoms in the alkyl radical, C) from 0.1% by weight to 2.0% by weight of crosslinking repeat units and D) from 0.0% by weight to 8.0% by weight of styrenic repeat units of the general formula (I)

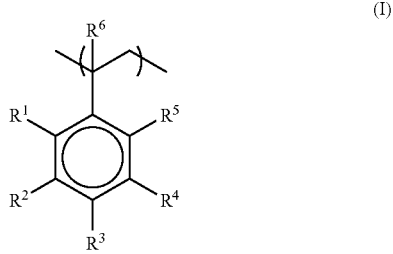

(I)

where the stated percentages by weight preferably give a total of 100.0% by weight.

These compounds A), B), C) and D) are naturally different from one another, and in particular the compounds A) and B) comprise no crosslinking monomers C).

Each of the radicals R1 to R5 is, independently of the others, hydrogen, a halogen, in particular fluorine, chlorine or bromine, or an alkyl group having from 1 to 6 carbon atoms, preferably hydrogen. The radical R6 is hydrogen or an alkyl group having from 1 to 6 carbon atoms, preferably hydrogen. Particularly suitable alkyl groups having from 1 to 6 carbon atoms are methyl, ethyl, n-propyl, isopropyl, n-butyl, sec-butyl, tert-butyl, n-pentyl, n-hexyl groups and cyclopentyl and cyclohexyl groups.

In this way styrenic repeat units of the general formula (I) encompass repeat structural units which are obtainable by polymerization of monomers of the general formula (Ia).

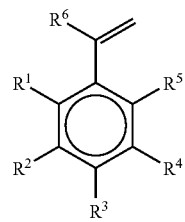

(Ia)

Suitable monomers of the general formula (Ia) in particular encompass styrene, substituted styrenes having an alkyl substituent in the side chain, for example α-methylstyrene and α-ethylstyrene, substituted styrenes having an alkyl substituent on the ring, for example vinyltoluene and p-methylstyrene, halogenated styrenes, for example monochlorostyrenes, dichloro-styrenes, tribromostyrenes and tetrabromostyrenes.

The abovementioned alkyl methacrylate repeat units (A) comprise repeat structural units which are obtainable via polymerization of esters of methacrylic acid. Suitable esters of methacrylic acid encompass in particular methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert-butyl-heptyl methacrylate, 3-isopropylheptyl methacrylate, decyl methacrylate, undecyl methacrylate, 5-methyl-undecyl methacrylate, dodecyl methacrylate, 2-methyl-dodecyl methacrylate, tridecyl methacrylate, 5-methyl-tridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates, for example cyclopentyl methacrylate, cyclohexyl methacrylate, 3-vinyl-2-butyl-cyclohexyl methacrylate, cycloheptyl methacrylate, cyclooctyl methacrylate, bornyl methacrylate and isobornyl methacrylate.

In one particularly preferred embodiment of the present invention, the core comprises, based on its total weight, at least 50% by weight, advantageously at least 60% by weight, preferably at least 75% by weight, in particular at least 85% by weight, of methyl methacrylate repeat units.

The abovementioned alkyl acrylate repeat units (B) comprise repeat structural units which are obtainable via polymerization of esters of acrylic acid. Suitable esters of acrylic acid encompass in particular methyl acrylate, ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, ethylhexyl acrylate, nonyl acrylate, 2-methyloctyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates, for example cyclopentyl acrylate, cyclohexyl acrylate, 3-vinyl-2-butylcyclohexyl acrylate, cycloheptyl acrylate, cyclooctyl acrylate, bornyl acrylate and isobornyl acrylate. The abovementioned crosslinking repeat units (C) comprise repeat structural units which are obtainable via polymerization of crosslinking monomers. Suitable crosslinking monomers encompass in particular all of the compounds which are capable, under the present polymerization conditions, of bringing about crosslinking. Among these are in particular
(a) Difunctional (meth)acrylates, preferably compounds of the general formula:

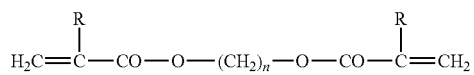

where R is hydrogen or methyl and n is a positive whole number greater than or equal to 2, preferably from 3 to 20, in particular di(meth)acrylates of propanediol, of butanediol, of hexanediol, of octanediol, of nonanediol, of decanediol, and of eicosanediol;
Compounds of the general formula:

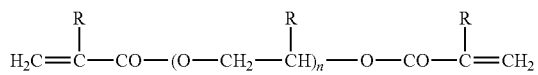

where R is hydrogen or methyl and n is a positive whole number from 1 to 14, in particular di(meth)acrylates of ethylene glycol, of diethylene glycol, of triethylene glycol, of tetraethylene glycol, of dodecaethylene glycol, of tetradecaethylene glycol, of propylene glycol, of dipropyl glycol, and of tetradecapropylene glycol. Glycerol di(meth)acrylate, 2,2'-bis[p-(γ-methacryloxy-β-hydroxypropoxy)phenylpropane] or bis-GMA, bisphenol A dimethacrylate, neopentyl glycol di(meth)acrylate, 2,2'-di(4-methacryloxypolyethoxyphenyl)propane having from 2 to 10 ethoxy groups per molecule and 1,2-bis(3-methacryloxy-2-hydroxypropoxy)-butane.
(b) Tri- or polyfunctional (meth)acrylates, in particular trimethylolpropane tri(meth)acrylates and pentaerythritol tetra(meth)acrylate.

Graft crosslinking agents having at least two C—C double bonds of differing reactivity, in particular allyl methacrylate and allyl acrylate; aromatic crosslinking agents, in particular 1,2-divinylbenzene, 1,3-divinylbenzene and 1,4-divinylbenzene.

The manner of selection of the proportions by weight of the constituents A) to D) of the core is preferably such that the core has a glass transition temperature Tg of at least 10° C., preferably of at least 30° C. The glass transition temperature Tg of the polymer here can be determined in a known manner by differential scanning calorimetry (DSC). The glass transition temperature Tg may also be approximated by means of the Fox equation. According to Fox T. G., Bull. Am. Physics Soc. 1, 3, p. 123 (1956):

$$\frac{1}{Tg} = \frac{x_1}{Tg_1} + \frac{x_2}{Tg_2} + \ldots + \frac{x_n}{Tg_n}$$

where xn is the proportion by weight (% by weight/100) of the monomer n and Tgn is the glass transition temperature in kelvins of the homopolymer of the monomer n. The person skilled in the art may obtain further useful information from Polymer Handbook 2$^{nd}$ Edition, J. Wiley & Sons, New York (1975), which gives Tg values for the homopolymers most commonly encountered.

The first shell of the inventive core-shell-shell particles has a glass transition temperature below 30° C., preferably below 10° C., in particular in the range from 0 to −75° C. The glass transition temperature Tg of the polymer here may be determined, as mentioned above, by means of differential scanning calorimetry (DSC) and/or approximated by means of the Fox equation.

The first shell encompasses, based on its total weight, the following constituents:
from 80.0% by weight to 98.0% by weight of (meth)acrylate repeat units and
from 2.0% by weight to 20.0% by weight of styrenic repeat units of the general formula (I), where the percentages by weight give a total of 100% by weight.

For the purposes of a very particularly preferred embodiment of the present invention, the first shell encompasses
E-1) from 80.0% by weight to 97.9% by weight of alkyl acrylate repeat units having from 3 to 8 carbon atoms in the alkyl radical and/or alkyl methacrylate repeat units having from 7 to 14 carbon atoms in the alkyl radical, in particular butyl acrylate repeat units and/or dodecyl methacrylate repeat units, and
E-2) from 0.1% by weight to 2.5% by weight of crosslinking repeat units,
F) from 2.0% by weight to 20.0% by weight of styrenic repeat units of the general formula (I), where the parts by weight preferably give a total of 100.0 parts by weight.

The compounds E-1), E-2) and F) here naturally differ from one another, and in particular the compounds E-1) comprise no crosslinking monomers E-2).

The second shell encompasses, based on its total weight, at least 75% by weight of (meth)acrylate repeat units. It preferably contains
from 50.0% by weight to 100.0% by weight, advantageously from 60.0% by weight to 100.0% by weight, particularly preferably from 75.0% by weight to 100.0% by weight, in particular from 85.0% by weight to 99.5% by weight, of alkyl methacrylate repeat units having from 1 to 20, preferably from 1 to 12, in particular from 1 to 8, carbon atoms in the alkyl radical,
from 0.0% by weight to 40.0% by weight, preferably from 0.0% by weight to 25.0% by weight and in particular from 0.1% by weight to 15.0% by weight, of alkyl acrylate repeat units having from 1 to 20, preferably from 1 to 12, in particular from 1 to 8, carbon atoms in the alkyl radical,
from 0.0% by weight to 10.0% by weight, preferably from 0.0% by weight to 8.0% by weight, of styrenic repeat units of the general formula (I),
where the stated percentages by weight preferably give a total of 100.0% by weight.

In one particularly preferred embodiment of the present invention, the second shell comprises, based on its total weight, at least 50% by weight, advantageously at least 60% by weight, preferably at least 75% by weight, in particular at least 85% by weight, of methyl methacrylate repeat units.

The manner of selection of constituents of the second shell is moreover advantageously such that the second shell has a glass transition temperature Tg of at least 10° C., preferably at least 30° C. The glass transition temperature Tg of the polymer here can be determined as mentioned above by differential scanning calorimetry (DSC) and/or approximated by the Fox equation.

The overall radius of the core-shell particle inclusive of any second shell present is in the range from greater than 160 to 260 nm, preferably in the range from 170 to 255 nm, in particular in the range from 175 to 250 nm. This overall radius is determined by the Coulter method. This method known from the literature for particle size determination is based on the measurement of the electrical resistance, which changes in a characteristic manner when particles pass through a narrow measuring aperture. Further details may be found by way of example in Nachr. Chem. Tech. Lab. 43, 553-566 (1995).

For the purposes of the present invention, furthermore, it has proven particularly advantageous if, based in each case on its total weight,
the proportion of the core is from 5.0% by weight to 50.0% by weight, preferably from 15.0% by weight to 50.0% by weight, advantageously from 25.0% by weight to 45.0% by weight, in particular from 30.0% by weight to 40.0% by weight,
the proportion of the first shell is from 20.0% by weight to 75.0% by weight, preferably from 30.0% by weight to 60.0% by weight, advantageously from 35.0% by weight to 55.0% by weight, in particular from 40.0% by weight to 50% by weight, and
the proportion of the second shell is from 0.0% by weight to 50.0% by weight, preferably from 5.0% by weight to 40.0% by weight, advantageously from 10.0% by weight to 30.0% by weight, in particular from 15.0% by weight to 25.0% by weight,
where the percentages by weight preferably give a total of 100.0% by weight.

The core-shell particles of the invention may be prepared in a manner known per se, for example by means of multistage emulsion polymerization. This advantageously uses a method in which water and emulsifier are used to form an initial charge. This initial charge preferably comprises from 90.00 to 99.99 parts by weight of water and from 0.01 to 10.00 parts by weight of emulsifier, where the stated parts by weight advantageously give a total of 100.00 parts by weight.

The following sequence is then applied stepwise to this initial charge
the monomers for the core are added in the desired ratios and polymerized to a conversion of at least 85.0% by weight, preferably at least 90.0% by weight, advantageously at least 95.0% by weight, in particular at least 99% by weight, based in each case on their total weight,
the monomers for the first shell are added in the desired ratios and polymerized to a conversion of at least 85.0% by weight, preferably at least 90.0% by weight, advantageously at least 95.0% by weight, in particular at least 99% by weight, based in each case on the total weight thereof,
where appropriate, the monomers for the second shell are added in the desired ratios and polymerized to a conversion of at least 85.0% by weight, preferably at least 90.0% by weight, advantageously at least 95.0% by weight, in particular at least 99% by weight, based in each case on the total weight thereof.

For the purposes of the present invention, polymers here are compounds whose molecular weight is at least 10 times that of the respective starting compound A) to I), known as the monomer.

The progress of the polymerization reaction into each step may be monitored in a known manner, for example gravimetrically or by means of gas chromatography. According to the present invention, the polymerization in steps b) to d) is preferably carried out at a temperature in the range from 0 to 120° C., preferably in the range from 30 to 100° C.

Polymerization temperatures which have proven very particularly advantageous here are in the range from above 60 to below 90° C., advantageously in the range from above 70 to below 85° C., preferably in the range from above 75 to below 85° C.

Initiation of the polymerization takes place using the initiators commonly used for emulsion polymerization. Examples of suitable organic initiators are hydroperoxides, such as tert-butyl hydroperoxide or cumene hydroperoxide. Suitable inorganic initiators are hydrogen peroxide and the alkali metal and ammonium salts of peroxodisulphuric acid, in particular sodium peroxodisulphate and potassium peroxodisulphate. Suitable redox initiator systems by way of example are combinations of tertiary amines with peroxides or sodium disulphite and peroxodisulphates of alkali metals and of ammonium, in particular sodium peroxodisulphate and potassium peroxodisulphate, or particularly preferably peroxides. Further details may be found in the technical literature, in particular H. Rauch-Puntigam, Th. Völker, "Acryl- und Methacryl-verbindungen" [Acrylic and methacrylic compounds], Springer, Heidelberg, 1967 or Kirk-Othmer, Encyclopedia of Chemical Technology, Vol. 1, pp. 386 et seq., J. Wiley, New York, 1978. For the purposes of the present invention, the use of organic and/or inorganic initiators is particularly preferred.

The initiators mentioned may be used either individually or else in a mixture. Their amount used is preferably from 0.05 to 3.0% by weight, based on the total weight of the monomers for the respective stage. It is also possible and preferable to carry out the polymerization using a mixture of various polymerization initiators of different half-life time, in order to keep the supply of free radicals constant during the course of the polymerization and at various polymerization temperatures.

The reaction mixture is preferably stabilized by means of emulsifiers and/or protective colloids. Preference is given to stabilization by emulsifiers, in order to obtain low dispersion viscosity. The total amount of emulsifier is preferably from 0.1 to 5% by weight, in particular from 0.5 to 3% by weight, based on the total weight of the monomers A) to I). Particularly suitable emulsifiers are anionic or non-ionic emulsifiers or mixtures of these, in particular:
alkyl sulphates, preferably those having from 8 to 18 carbon atoms in the alkyl radical, alkyl and alkylaryl ether sulphates having from 8 to 18 carbon atoms in the alkyl radical and from 1 to 50 ethylene oxide units;
sulphonates, preferably alkylsulphonates having from 8 to 18 carbon atoms in the alkyl radical, alkylarylsulphonates having from 8 to 18 carbon atoms in the alkyl radical, esters and half-esters of sulphosuccinic acid with monohydric alcohols or alkylphenols having from 4 to 15 carbon atoms in the alkyl radical; where appropriate, these alcohols or alkylphenols may also have been ethoxylated with from 1 to 40 ethylene oxide units;
partial esters of phosphoric acid and the alkali metal and ammonium salts of these, preferably alkyl and alkylaryl phosphates having from 8 to 20 carbon atoms in the alkyl and, respectively, alkylaryl radical and from 1 to 5 ethylene oxide units;
alkyl polyglycol ethers, preferably having from 8 to 20 carbon atoms in the alkyl radical and from 8 to 40 ethylene oxide units;
alkylaryl polyglycol ethers, preferably having from 8 to 20 carbon atoms in the alkyl and, respectively, alkylaryl radical and from 8 to 40 ethylene oxide units;
ethylene oxide-propylene oxide copolymers, preferably block copolymers, advantageously having from 8 to 40 ethylene oxide and, respectively, propylene oxide units.

According to the invention, preference is given to using mixtures composed of anionic emulsifier and of non-ionic emulsifier. Mixtures which have proven very particularly successful here are those composed of an ester or half-ester of sulphosuccinic acid with monohydric alcohols or alkylphenols having from 4 to 15 carbon atoms in the alkyl radical, as anionic emulsifier, and of an alkyl polyglycol ether, preferably having from 8 to 20 carbon atoms in the alkyl radical and from 8 to 40 ethylene oxide units, as non-ionic emulsifier, in a ratio of from 8:1 to 1:8 by weight.

Where appropriate, the emulsifiers may also be used in a mixture with protective colloids. Suitable protective colloids encompass, inter alia, partially hydrolyzed polyvinyl acetates, polyvinylpyrrolidones, carboxy-methyl-, methyl-, hydroxyethyl-, hydroxypropyl-cellulose, starches, proteins, poly(meth)acrylic acid, poly(meth)acrylamide, polyvinylsulphonic acids, melamine-formaldehydesulphonates, naphthalene-formaldehydesulphonates, styrene-maleic acid copolymers and vinyl ether-maleic acid copolymers. If use is made of protective colloids, the amount preferably used of these is from 0.01 to 1.0% by weight, based on the total amount of the monomers A) to I). The protective colloids may be used to form an initial charge prior to the start of the polymerization, or may be metered in. The initiator may be used to form an initial charge or may be metered in. Another possibility, furthermore, is use of a portion of the initiator to form an initial charge and metering-in of the remainder.

The polymerization is preferably initiated by heating the reaction mixture to the polymerization temperature and by metering-in of the initiator, preferably in aqueous solution. The feeds of emulsifier and monomers may be separate or take the form of a mixture. If mixtures composed of emulsifier and monomer are metered in, the procedure comprises premixing emulsifier and monomer in a mixer installed upstream of the polymerization reactor. It is preferable for the remainder of emulsifier and the remainder of monomer which were not used to form an initial charge to be metered in separately from one another after the start of the polymerization. The feed is preferably begun from 15 to 35 minutes after the start of the polymerization.

For the purposes of the present invention, furthermore, it is particularly advantageous for the initial charge to comprise what is known as a "seed latex", which is preferably obtainable by polymerization of alkyl (meth)acrylates and moreover advantageously has a particle radius in the range from 3.0 to 20.0 nm. These small radii may be calculated after a defined polymerization onto the seed latex, during which a shell is built up around the seed latex, and measuring the radii of the resultant particles by the Coulter method. This method of particle size determination, known from the literature, is based on measurement of the electrical resistance, which changes in a characteristic manner when particles pass through a narrow measuring aperture. Further details may be found by way of example in Nachr. Chem. Tech. Lab. 43, 553-566 (1995).

The monomer constituents of the actual core, i.e. the first composition, are added to the seed latex, preferably under conditions such that the formation of new particles is avoided. The result of this is that the polymer formed in the first stage of the process is deposited in the form of a shell around the seed latex. Similarly, the monomer constituents of the first shell material (second composition) are added to the emulsion polymer under conditions such that the formation of new particles is avoided. The result of this is that the polymer formed in the second stage is deposited in the form of a shell around the existing core. This procedure is to be repeated appropriately for each further shell.

In another preferred embodiment of the present invention, the core-shell particles of the invention are obtained by an emulsion polymerization process in which, instead of the seed latex, a long-chain aliphatic alcohol, preferably having from 12 to 20 carbon atoms, emulsified, is used to form an initial charge. In one preferred embodiment of this process, the long-chain aliphatic alcohol used comprises stearyl alcohol. Similarly to the procedure described above, the core-shell structure is obtained by stepwise addition and polymerization of the corresponding monomers, avoiding the formation of new particles. The person skilled in the art can find further details on the polymerization process in the Patent Specifications DE 3343766, DE 3210891, DE 2850105, DE 2742178 and DE 3701579.

However, for the purposes of the present invention, irrespective of the specific procedure, it has proven very particularly advantageous for the second and the third monomer mixture to be metered in as required by consumption.

The chain lengths, in particular of the (co)polymers of the second shell, may be adjusted via polymerization of the monomer or of the monomer mixture in the presence of molecular weight regulators, for example in particular of the mercaptans known for this purpose, for example n-butyl mercaptan, n-dodecyl mercaptan, 2-mercaptoethanol or 2-ethylhexyl thioglycolate, pentaerythritol tetrathioglycolate; the amounts used of the molecular weight regulators generally being from 0.05 to 5% by weight, based on the monomer mixture, preferably from 0.1 to 2% by weight and particularly preferably from 0.2 to 1% by weight, based on the monomer mixture (cf., for example, H. Rauch-Puntigam, Th. Völker, "Acryl-und Methacrylverbindungen" [Acrylic and methacrylic compounds], Springer, Heidelberg, 1967; Houben-Weyl, Methoden der organischen Chemie [Methods of organic chemistry], Vol. XIV/1. p. 66, Georg Thieme, Heidelberg, 1961 or Kirk-Othmer, Encyclopedia of Chemical Technology, Vol. 1, pp. 296 et seq., J. Wiley, New York, 1978). The molecular weight regulator used preferably comprises n-dodecyl mercaptan.

After conclusion of the polymerization, post-polymerization may be carried out for residual monomer removal, using known methods, for example using initiated post-polymerization.

Since the process of the invention is particularly suitable for preparing aqueous dispersions with high solids content above 50% by weight, based on the total weight of the aqueous dispersion, the manner of selection of the relative proportions of all of the substances is advantageously such that the total weight of monomers, based on the total weight of the aqueous dispersion, is above 50.0% by weight, advantageously above 51.0% by weight, preferably above 52.0% by weight. The substances to be taken into account in this connection also include, besides the monomers, all of the other substances used, for example water, emulsifier, initiator, where appropriate regulators and protective colloids, etc.

The aqueous dispersions obtainable by the process feature a low coagulate content which, based on the total weight of the aqueous dispersion, is preferably less than 5.0% by weight, advantageously less than 3.0% by weight, in particular less than 1.5% by weight. In one particularly preferred embodiment of the present invention, the aqueous dispersion comprises, based on its total weight, less than 1.0% by weight, preferably less than 0.5% by weight, advantageously less than 0.25% by weight, in particular 0.10% by weight or less, of coagulate.

The term "coagulate" in this connection means water-insoluble constituents, which may preferably be filtered off by filtering the dispersion advantageously through a filter ruffle in which a No. 0.90 DIN 4188 filter fabric has been fixed.

The core-shell particle of the invention may be obtained from the dispersion for example by spray drying, freeze coagulation, precipitation by electrolyte addition or by exposure to mechanical or thermal stress, where the latter can be carried out by means of a vented extruder according to DE 27

50 682 A1 or U.S. Pat. No. 4,110,843. The process of spray drying is the most commonly used, but the other processes mentioned have the advantage that they provide at least some separation of the water-soluble polymerization auxiliaries from the polymer.

The PMMA moulding composition can also, if appropriate, be blended with diffuser beads, in order to achieve light-scattering properties. Production of the diffuser beads is described by way of example in DE 42 319 95, in Examples 1 to 7. The amount of diffuser beads, based on the amount of non-scattering moulding composition, can be from 0.1% by weight to 60% by weight, preferably from 0.2% by weight to 50% by weight, and very particularly preferably from 0.5% by weight to 45% by weight.

As thermoplastic polyurethane, a product having aliphatic linking units is used.

Polyurethanes (PUs) are polymers in whose macro-molecules the repeat units have been linked via urethane groups —NH—CO—O—. Polyurethanes are generally obtained via polyaddition from di- or polyhydric alcohols and from isocyanates as follows:

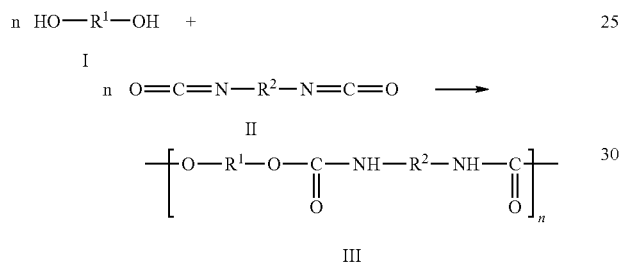

R1 and R2 here can be low molecular weight or even polymeric aliphatic or aromatic groups. Industrially important PUs are prepared from polyester- and/or polyetherdiols and, for example, tolylene 2,4- or 2,6-diisocyanate (TDI, R2=C6H3-CH3), methylene-diphenyl 4,4'-isocyanate (MDI, R2=C6H4-CH2-C6H4), methylenedicyclohexyl 4,4'-isocyanate (HMDI, R2=C6H10-CH2-C6H10) or hexamethylene diisocyanate [HDI, R2=(CH2)6].

The PUs can generally be synthesized without solvent or in inert organic solvents. Catalysts used for the polyaddition reaction are often certain amines or organotin compounds. Use of dihydric alcohols and of isocyanates in equimolar ratios leads to linear PUs. Branched and crosslinked products are produced when higher-functionality starting materials are used concomitantly, or else when there is an excess of isocyanate, in which case isocyanate groups react with urethane groups or urea groups to form allophanate structures or biuret structures, an example being:

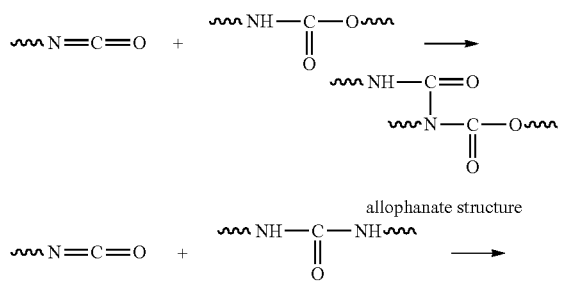

Accordingly, as a function of the selection and stoichiometric ratio of the starting materials the products are PUs with very different mechanical properties, and these have a wide variety of applications as constituents of adhesives and of lacquers (P. resins), as ionomers, as thermoplastic material for bearing parts, pulleys, tyres or rollers, and as elastomers of varying hardness in fibre form (elastic fibres, the abbreviation used for these elastane or spandex fibres being PUE), or as polyether- or polyesterurethane rubber (the abbreviation being, respectively, EU and AU to DIN ISO 1629: 1981-10), or as thermoset casting resins (including those having glass fibre reinforcement) etc., or else as foam plastics; see also polyurethane rubbers, polyurethane lacquers and polyurethane resins. PUs have also been described inter alia in Kunststoffe 85, 1616 (1995), Batzer 3, 158-170 Batzer 3, 158-170; Dominghaus (5th), pp. 1140 ff.; Encycl. Polym. Sci. Eng. 13, 243-303; Houben-Weyl E 20/2, 1561-1721.

INVENTIVE SUBJECT MATTER AND EXAMPLES

Blending of Moulding Compositions

Example A

Here, a TPU (Desmopan® W DP85786A, Bayer) was compounded with PLEXIGLAS® zk5HC from Röhm GmbH & Co. KG with the aid of an extruder (ratio TPU/PLEXIGLAS® zk5HC:1/2.75). The extrusion temperature was from 200 degrees Celsius to 260 degrees Celsius.

Alongside this blend, the following moulding compositions are introduced as comparisons:
PLEXIGLAS® zk50, Röhm Comparative Example 1

Blend composed of a silicone modifier, prepared as described in Example 2 in WO 2003/066695, with PLEXIGLAS® 7H from Röhm GmbH & Co. KG (silicone modifier content: 25% by weight)

Comparative Example 2

Blend composed of C/S/S modifier and PLEXIGLAS® 7N prepared as described in Example B in DE 102 600 65 A1.

Comparative Example 3

Here, a TPU (Desmopan® W DP85786A, Bayer AG) was compounded with PLEXIGLAS® 7M from Röhm GmbH & Co. KG with the aid of an extruder (ratio TPU/7M:1/2.75).

Testing of Moulding Compositions

Test specimens were produced from the blended moulding compositions. The following methods were used to test the moulding compositions and, respectively, the corresponding test specimens:

| Viscosity ηs (220° C./5 MPa) | Determination of melt viscosity, test standard: DIN 54811: 1984 |
|---|---|
| MVR (230° C./3.8 kg) | Determination of volume flow index, test standard ISO 1133: 1997 |
| Mini-Vicat (16 h/80° C.) | Determination of Vicat softening point using mini-Vicat system test standard DIN ISO 306: August 1994 |
| IR (Charpy) | Determination of Charpy notched impact resistance, test standard: ISO 179 |
| Modulus of elasticity | Determination of modulus of elasticity, test standard: ISO 527-2 |
| Transmittance (D 65/10°) | Measurement of transmittance for D65 and 10° on a specimen of thickness 3 mm, test standard: DIN 5033/5036 |

Table 1 gives the results of the tests on the blends.

The advantages of the inventive blend over the conventional impact-modified moulding compositions can be clearly seen (comparison 1, 2, 3 and PLEXIGLAS® zk50):

Impact resistance is very high: 124 kJ/m² at 23° C. and 50 kJ/m² at −10° C. Some impact resistance is even present at −40° C.: 23 kJ/m².

At over 80%, room-temperature transmittance of a sheet of thickness 3 mm composed of the material is still sufficient for ski foils, which are an example of an intended application.

The moulding composed of the blend to be protected has good mechanical properties, with modulus of elasticity above 1200 MPa.

With Vicat softening point above 85° C., heat resistance is sufficiently high for applications such as ski foils.

The material is easy to process by virtue of low melt viscosity (cf. also MVR).

Foils composed of these blends are markedly easier to print than foils conventionally used here composed of polyamide or TPU/MABS blends, and have weathering resistance.

TABLE 1

| Blend Property | Unit | Comp. 1 | Comp. 2 | Comp. 3 | PLEXIGLAS® zk50 | A |
|---|---|---|---|---|---|---|
| Viscosity ηs (220° C./5 MPa) | Pas | 6940 | 3400 | 171 | n.d. | 500 |
| MVR (230° C./3.8 kg) | ml/10 min | 0.3 | 1.4 | 42 | 0.1 | 9.15 |
| Mini-Vicat (16 h/80° C.) | ° C. | 99 | 98.5 | 89.7 | 75 | 87 |
| Transmittance | % | n.d. | 64.6 | 80.1 | 89 | 83 |
| IR (Charpy) | | | | | | |
| 23° C. | kJ/m² | 39 | 122 | 24.3 | no fracture | 124 |
| −10° C. | kJ/m² | — | | | | 50 |
| −20° C. | kJ/m² | 35 | 92 | 22.9 | 110.4 | 26 |
| −40° C. | kJ/m² | 35 | 53 | 21.4 | 22.9 | 23 |
| Modulus of elasticity | MPa | 2120 | 1620 | n.d. | 950 | 1520 |

The invention claimed is:

1. A transparent plastic mixture having a low temperature impact resistance comprising thermoplastic polyurethane and poly(meth)acrylate; wherein said poly(meth)acrylate is an impact-modified poly(meth)acrylate,
    wherein the mixture excludes a copolymer derivable from polyacrylonitriles and polystyrenes.

2. The transparent plastic mixture according to claim 1, wherein a weight ratio of said thermoplastic polyurethane to said poly(meth)acrylate is 10-50:90-50.

3. The transparent plastic mixture according to claim 1, wherein a weight ratio of said thermoplastic polyurethane to said poly(meth)acrylate is 20-40:80-60.

4. The transparent plastic mixture according to claim 1, wherein said impact-modified poly(meth)acrylate is an impact-resistant molding composition comprising: from 10 wt. % to 50 wt. % of an impact modifier; and from 50 wt. % to 90 wt. % of a poly(meth)acrylate molding composition.

5. The transparent plastic mixture according to claim 1, wherein said poly(meth)acrylate comprises an impact-modified poly(meth)acrylate and scattering particles having an average particle diameter of from 1 μm to 300 μm, wherein said scattering particles are present in an amount of from 1 wt. % to 50 wt. % based on the total weight of the transparent plastic mixture.

6. The transparent plastic mixture according to claim 1, wherein said thermoplastic polyurethane is prepared from polyhydric alcohols and aliphatic isocyanates.

7. An impact-resistant molding composition comprising the transparent plastic mixture according to claim 1, wherein the impact-resistant molding composition has a transmittance of >80% (t=3 mm), a modulus of elasticity of >1400 MPa, a Vicat softening point of >80° C. as determined according to DIN ISO 306 (B), and a Charpy impact resistance of >100 kJ/m² at 23° C., a Charpy impact resistance of >30 kJ/m² at −10° C., and a Charpy impact resistance of >20 kJ/m² at −20° C.

8. The impact-resistant molding composition according to claim 7, further comprising diffuser beads.

9. A foil comprising the impact-resistant molding composition according to claim 7.

10. A coated article comprising an article coated with the foil of claim 9.

11. The coated article according to claim 10, wherein said article is selected from sports equipment and an automobile bodywork.

12. An injection-molded article comprising the impact-resistant molding composition according to claim 7.

13. The injection-molded article according to claim 12, wherein said injection-molded article is an automobile part.

14. The transparent plastic mixture according to claim 1, wherein said low temperature impact resistance is measured at one of the following temperatures −40° C. or −10° C.

15. The transparent plastic mixture according to claim 1, wherein said low temperature is at temperatures of between −40° C. or −10° C.

16. The transparent plastic mixture according to claim 1, which consists of said thermoplastic polyurethane and poly(meth)acrylate.

\* \* \* \* \*